United States Patent
Wang et al.

(10) Patent No.: US 12,334,080 B2
(45) Date of Patent: Jun. 17, 2025

(54) NEURAL NETWORK-BASED SIGNAL PROCESSING APPARATUS, NEURAL NETWORK-BASED SIGNAL PROCESSING METHOD, AND COMPUTER-READABLE STORAGE MEDIUM

(71) Applicant: NEC Corporation, Tokyo (JP)

(72) Inventors: Qiongqiong Wang, Tokyo (JP); Takafumi Koshinaka, Tokyo (JP); Kong Aik Lee, Tokyo (JP)

(73) Assignee: NEC CORPORATION, Tokyo (JP)

( * ) Notice: Subject to any disclaimer, the term of this patent is extended or adjusted under 35 U.S.C. 154(b) by 552 days.

(21) Appl. No.: 17/764,291

(22) PCT Filed: Oct. 18, 2019

(86) PCT No.: PCT/JP2019/041226
§ 371 (c)(1),
(2) Date: Mar. 28, 2022

(87) PCT Pub. No.: WO2021/075063
PCT Pub. Date: Apr. 22, 2021

(65) Prior Publication Data
US 2022/0335950 A1    Oct. 20, 2022

(51) Int. Cl.
*G10L 17/18*    (2013.01)
*G06N 3/08*    (2023.01)
*G10L 17/02*    (2013.01)
(52) U.S. Cl.
CPC .............. *G10L 17/18* (2013.01); *G06N 3/08* (2013.01); *G10L 17/02* (2013.01)

(58) Field of Classification Search
CPC ............ G10L 17/18; G10L 17/02; G06N 3/08
See application file for complete search history.

(56) References Cited

U.S. PATENT DOCUMENTS

2020/0322377 A1* 10/2020 Lakhdhar ............... G06N 3/045

OTHER PUBLICATIONS

Cheng-I Lai, Nanxin Chen, Jesus Villalba, Najim Dehak, "ASSERT: Anti-Spoofing with Squeeze-Excitation and Residual neTworks", Apr. 1, 2019, arXiv:1904.01120v1 (Year: 2019).*
Wei Xia, Kazuhito Koishida, "Sound Event Detection in Multichannel Audio using Convolutional Time-Frequency-Channel Squeeze and Excitation", Aug. 4, 2019. arXiv:1908.01399v1 (Year: 2019).*
Abhijit Guha Roy, Nassir Navab, Christian Wachinger, "Concurrent Spatial and Channel 'Squeeze & Excitation' in Fully Convolutional Networks", Jun. 8, 2018, arXiv:1803.02579v2 (Year: 2018).*

(Continued)

*Primary Examiner* — Pierre Louis Desir
*Assistant Examiner* — Daniel W Chung

(57) ABSTRACT

A spoofing detection apparatus 100 includes a multi-channel spectrogram creation unit 10 and an evaluation unit 40. The multi-channel spectrogram creation unit 10 extracts different type of spectrograms from speech data and integrates the different type of spectrograms to create a multi-channel spectrogram. The evaluation unit 40 evaluates the created multi-channel spectrogram by applying the created multi-channel spectrogram to a classifier constructed using labeled multi-channel spectrograms as training data and classifies it to either genuine or spoof.

12 Claims, 12 Drawing Sheets

(56) References Cited

OTHER PUBLICATIONS

International Search Report for PCT Application No. PCT/JP2019/041226, mailed on Dec. 17, 2019.
Cheng-I Lai et al., "Attentive Filtering Networks for Audio Replay Attack Detection", ICASSP 2019, pp. 1-6.
Okabe, K., et al., "Attentive Statistics Pooling for Deep Speaker Embedding", Feb. 25, 2019, version v2, pp. 1-5, [retrieved on Dec. 4, 2019], Retrieved from the Internet: <URL: https://arxiv.org/pdf/1803.10963v2.pdf>.
Salakhutdinov, R., "STA 4273H: Statistical Machine Learning", Lecture 3, [online], Sep. 27, 2011, University of Toronto, pp. 1-55, [retrieved on Dec. 4, 2019], Retrieved from the Internet: <URL:http://www.utstat.toronto.edu/-rsalakhu/sta4273/notes/Lecture3.pdf>.
Takahashi, G., et al., "Acoustic Scene Classification Based on Spatial Feature Extraction Using Convolutional Neural Networks", Journal of Signal Processing, Jul. 25, 2018, vol. 22, No. 4, pp. 199-202, ISSN: 1880-1013, [online], [retrieved on Dec. 4, 2019], Internet: <URL: https://www.jstage.jst.go.jp/article/jsp/22/4/22_199/_article/-char/ja/>.
Chunlei Zhang, et al., "Joint Information From Nonlinear and Linear Features for Spoofing Detection: An I-Vector/DNN Based Approach", Proceedings of the 2016 IEEE International Conference on Acoustic, Speech and Signal Processing (ICASSP 2016), Mar. 25, 2016, pp. 5035-5039, ISBN: 978-1-4799-9988-0.
Written opinion for PCT Application No. PCT/JP2019/041226, mailed on Dec. 17, 2019.

\* cited by examiner

NEURAL NETWORK-BASED SIGNAL PROCESSING APPARATUS, NEURAL NETWORK-BASED SIGNAL PROCESSING METHOD, AND COMPUTER-READABLE STORAGE MEDIUM

This application is a National Stage Entry of PCT/JP2019/041226 filed on Oct. 18, 2019, the contents of all of which are incorporated herein by reference, in their entirety.

TECHNICAL FIELD

Feature map extraction is essential in speech processing related tasks, including speech recognition, speaker verification, spoofing detection and so on. Multiple feature maps for a single audio are often available, for example, Fast Fourier Transform (FFT) spectrograms extracted with different window lengths and Constant Q transform (CQT). Those feature maps extracted by different means consist of different information. They are usually complimentary to each other for the tasks.

Traditionally, there are feature fusion or score fusion to make use of the multiple feature maps. Feature fusion includes feature map concatenation along one dimension such as time or frequency dimension, feature map stacking into a 3D feature set, and linear interpolation and so on. Score fusion can be used to fuse scores produced from systems using single feature map.

Deep neural networks (DNN) have been widely used to replace a part of or the whole pipeline of the speech processing tasks, and shown certain improvement. Attention mechanisms have been introduced to deep learning that further makes features more discriminative for the tasks. Therefore, when there are multiple types of feature maps for the audios, automatic selection of the best feature map is a promising approach.

CITATION LIST

Non Patent Literature

[NPL 1]
C. Lai+, "Attentive Filtering Networks for Audio Replay Attack Detection", ICASSP 2019

SUMMARY OF INVENTION

Technical Problem

NPL 1 introduces an attentive filtering layer to enhance feature maps in both the frequency and time domains, by automatically and jointly leaning weights for the feature map (one weight for one feature in the feature map) with a spoofing detection neural network. However, the attention mechanism in NPL 1 is suitable only in the case of a single feature map input, not applicable across multiple feature maps.

One example of an object of the present invention is to resolve the foregoing problem and provide a neural network-based signal processing apparatus, a neural network-based signal processing method, and a computer-readable recording medium that can evaluate important features and support selection of the important features, even if the important features locate differently across feature maps.

Solution to Problem

In order to achieve the foregoing object, a neural network-based signal processing apparatus according to one aspect of the present invention includes:

a multi-dimension attentive neural network evaluation unit that receives a multi-dimension features which contain two or more two-dimension feature maps, produces an attention weight for each element in the multi-dimension features by using a neural network, and produces low-dimension features or posterior probabilities for designated classes, based on the multi-dimension features and the attention weight.

In order to achieve the foregoing object, a neural network-based signal processing method according to one aspect of the present invention includes:

(a) a step of receiving a multi-dimension features which contain two or more two-dimension feature maps, produces an attention weight for each element in the multi-dimension features by using a neural network, and producing low-dimension features or posterior probabilities for designated classes, based on the multi-dimension features and the attention weight.

In order to achieve the foregoing object, a computer-readable recording medium according to still another aspect of the present invention has recorded therein a program, and the program includes an instruction to cause the computer to execute:

(a) a step of receiving a multi-dimension features which contain two or more two-dimension feature maps, produces an attention weight for each element in the multi-dimension features by using a neural network, and producing low-dimension features or posterior probabilities for designated classes, based on the multi-dimension features and the attention weight.

Advantageous Effects of Invention

As described above, according to the present invention, it is possible to evaluate important features and support selection of the important features, even if the important features locate differently across feature maps.

BRIEF DESCRIPTION OF DRAWINGS

The drawings together with the detailed description, serve to explain the principles for the inventive neural network-based signal processing method. The drawings are for illustration and do not limit the application of the technique.

Skilled artisans will appreciate that elements in the figures are illustrated for simplicity and clarity and have not necessarily been drawn to scale. For example, the dimensions of some of the elements in the figures illustrating integrated circuit architecture may be exaggerated relative to other elements to help to improve understanding of the present and alternate example embodiments.

DESCRIPTION OF EMBODIMENTS

Each example embodiment of the present invention will be described below with reference to the figures. The following detailed descriptions are merely exemplary in nature and are not intended to limit the invention or the application and uses of the invention. Furthermore, there is no intention to be bound by any theory presented in the preceding background of the invention or the following detailed description.

Embodiment

Example embodiment of the present invention are described in detail below referring to the accompanying drawings.

Apparatus Configuration

Figure 1:
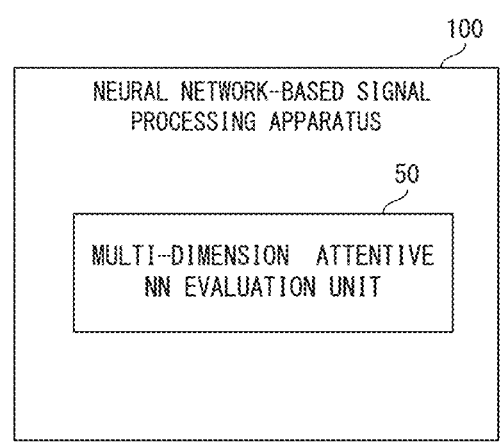
FIG. 1 is a block diagram schematically showing the configuration of the neural network-based signal processing apparatus according to the embodiment of the present invention.

First, a configuration of a neural network-based signal processing apparatus 100 according to the present embodiment will be described using FIG. 1. FIG. 1 is a block diagram schematically showing the configuration of the neural network-based signal processing apparatus according to the embodiment of the present invention.

As shown in FIG. 1, the neural network-based signal processing apparatus of the embodiment includes a multi-dimension attentive neural network (NN) evaluation unit 50. The multi-dimension attentive NN evaluation unit 50 receives a multi-dimension features which contain two or more two-dimension feature maps. Next, the multi-dimension attentive NN evaluation unit 50 produces an attention weight for each element in the multi-dimension features by using a neural network. After that the multi-dimension attentive NN evaluation unit 50 produces low-dimension features or posterior probabilities for designated classes, based on the multi-dimension features and the attention weight.

As described above, according to the neural network-based signal processing apparatus 100, it is possible to evaluate important features and support selection of the important features, even if the important features locate differently across feature maps.

Figure 2:
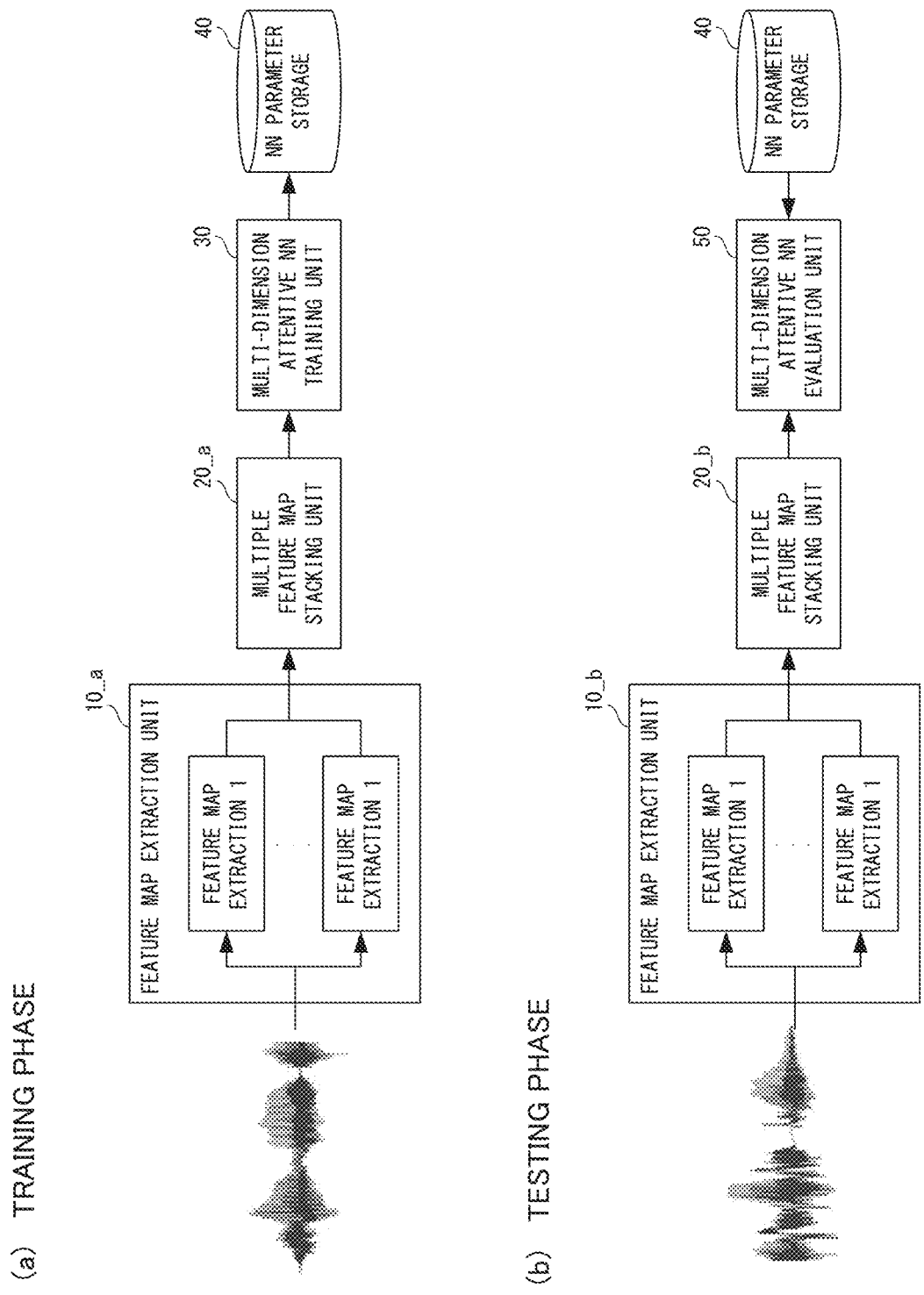
FIG. 2 depicts an exemplary block diagram illustrating the structure of an exemplary embodiment of the signal processing apparatus according to the present invention.

Subsequently, the configuration of the neural network-based signal processing apparatus according to the embodiment will be more specifically described with reference to FIGS. 2 to 4. FIG. 2 depicts an exemplary block diagram illustrating the structure of an exemplary embodiment of the neural network-based signal processing apparatus according to the present invention.

In the present embodiment, the neural network-based signal processing apparatus functions in a training phase and a test phase. Therefore, in FIG. 2, the configuration of the neural network-based signal processing apparatus is shown separately in a training phase and a testing phase.

As shown in FIG. 2, the neural-network based signal processing apparatus 100 according to the present exemplary embodiment includes further a feature map extraction unit 10, a multiple feature map stacking unit 20, a multi-dimension attentive neural network (NN) training unit 30, and a neural network (NN) parameter storage 40, in addition to the multi-dimension attentive neural network (NN) evaluation unit 50.

Among these, the feature map extraction unit 10 and the multiple feature map stacking unit 20 function in both phases. For this reason, the feature map feature 10 is represented as 10_*a* in the training phase and 10_*b* in the testing phase. Similarly, the multiple feature map stacking unit 20 is also represented as 20_*a* in the training phase and 20_*b* in the testing phase.

In the training phase, the feature map extraction unit 10_*a* extracts multiple feature maps from input training data. The multiple feature map stacking unit 20_*a* stacks the multiple extracted feature maps to a 3D feature set. The multi-dimension attentive NN training unit 30 trains a neural network using the 3D feature sets and labels of the training data. The multi-dimension attentive NN training unit 30 stores the trained NN parameter in NN parameter storage 40.

In the evaluation phase, the feature map extraction unit 10_*b* extracts multiple feature maps from input testing data. The multiple feature map stacking unit 20_*b* stacks the multiple extracted feature maps to a 3D feature set. The multi-dimension attentive NN evaluation unit 50 receives NN parameters from storage 40 and receives the 3D feature set from the multiple feature map stacking unit 20_*b*. After that, the multi-dimension attentive NN evaluation unit 50 calculates the posterior for a certain output node.

In an example of spoofing detection, the multi-dimension attentive NN evaluation unit 50 calculates the posterior of node "spoof" as the score. Note that the multi-dimension attentive NN evaluation unit 50 can also output hidden layers as a new feature set for the input audio. Then the feature set can be used together with any classifiers, such as cosine similarity, probabilistic linear discriminant analysis (PLDA) and so on.

Furthermore, the multi-dimension attentive NN evaluation unit 50 can squeezes the multi-dimension features along two dimensions by calculating statistics and produces an attention weight for the rest one dimension by using the neural network. And more, the multi-dimension attentive NN evaluation unit 50 can squeeze the multi-dimension features along any single dimension by calculating statistics and produces an attention weight for the rest two dimensions by using a neural network.

Specific five examples of the multi-dimension attentive neural network training unit 30 will be described with reference to FIGS. 3-8.

Figure 3:
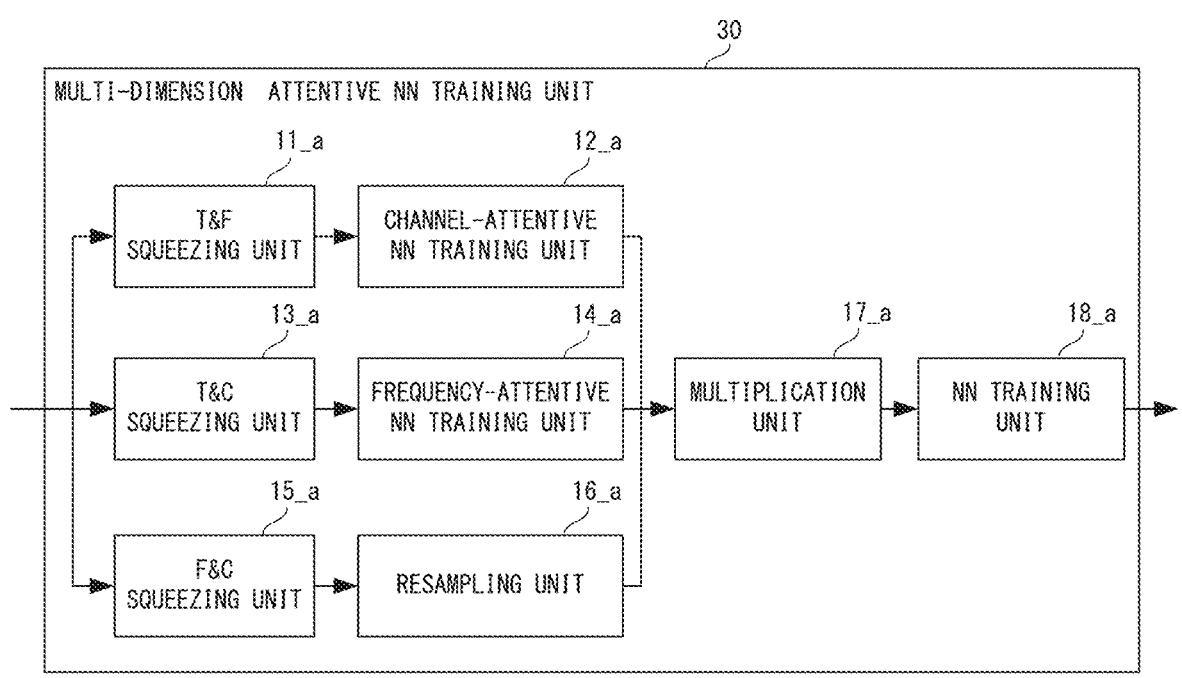
FIG. 3 is a block diagram illustrating the first example of multi-dimension attentive neural network training unit according to the exemplary embodiment.

FIG. 3 is a block diagram illustrating an example 1 of the multi-dimension attentive neural network (NN) training unit 30 according to the exemplary embodiment. In FIG. 3, the multi-dimension attentive NN training unit 30 includes a time- and frequency-dimension (T&F) squeezing unit 11_a, a channel-attentive NN training unit 12_a, a time- and channel-dimension (T&C) squeezing unit 13_a, a frequency-attentive NN training unit 14_a, a frequency- and channel-dimension (F&C) squeezing unit 15_a, a time-attentive NN training unit 16_a, a multiplication unit 17_a and a NN training unit 18_a.

The T&F squeezing unit 11_a squeezes the input 3D feature sets of $[d_c, d_t, d_f]$ dimension along both of the time and frequency dimensions, and gets two statistics (mean and standard deviation) of $d_c$ dimension. The channel-attentive NN training unit 12_a takes the statistics as input and outputs a set of weights for channels, and expands the weights of $d_c$ dimension into $[d_c, d_t, d_f]$ by copying, the same size as the input feature map.

Figure 4:
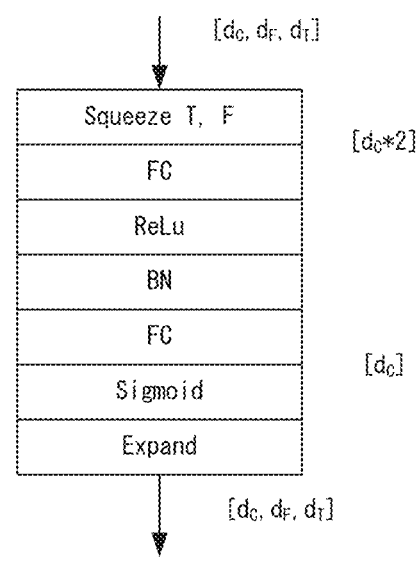
FIG. 4 is a diagram illustrating an example of a channel-attentive network.

One example of the channel-attentive NN training unit 12_a is shown FIG. 4. It is a squeeze excitation network. The statistics of $[2*d_c]$ dimension is input into a fully connected (FC) layer, followed by a Rectified Linear Unit (ReLU) non-linear activation. Then, the output of ReLU activation does batch normalization and inputs into another fully connected (FC) layers to get the output weights of $[d_c]$ dimension, and the last layer expands the weights into a matrix of $[d_c, d_t, d_f]$, the same size as the input feature map.

The T&C squeezing unit 13_a squeezes the 3D feature sets, along both of the time and channel dimensions, and gets the mean and standard deviation statistics of $d_f$ dimension. The frequency-attentive NN training unit 14_a takes the statistics as input and outputs a set $(d_f)$ of weights for frequency bins, and expands the weights into $[d_c, d_t, d_f]$ dimension, the same size as the input feature map. The frequency-attentive NN training unit 14_a can be the same as or different from the example of the channel-attentive NN training unit 12_a shown FIG. 4.

The F&C squeezing unit 15_a squeezes the 3D feature sets, along both of the frequency and channel dimensions, and gets the mean and standard deviation statistics of $d_t$ dimension. The time-attentive NN training unit 16_a takes the statistics as input and outputs a set $(d_f)$ of weights for time frames, and expands the weights into $[d_c, d_t, d_f]$ dimension, the same size as the input feature map. The time-attentive NN training unit 16_a can be the same as or different from the example of the channel-attentive NN training unit 12_a shown FIG. 4.

The multiplication unit 17_a multiplies the three weight matrices with the input 3D feature sets in the element-wise manner, and passes them to the NN training unit 18_a, which includes one or more hidden layers and one output layer. In an example of spoofing detection, the output layer consist of two nodes, "spoof" and "genuine". In an example of speaker recognition, the nodes in the output layer are speaker IDs. Note that the multi-dimension attentive NN training unit 10 (11_a~18_a) is trained jointly with only one objective function, for example, cross entropy loss minimization.

Figure 5:
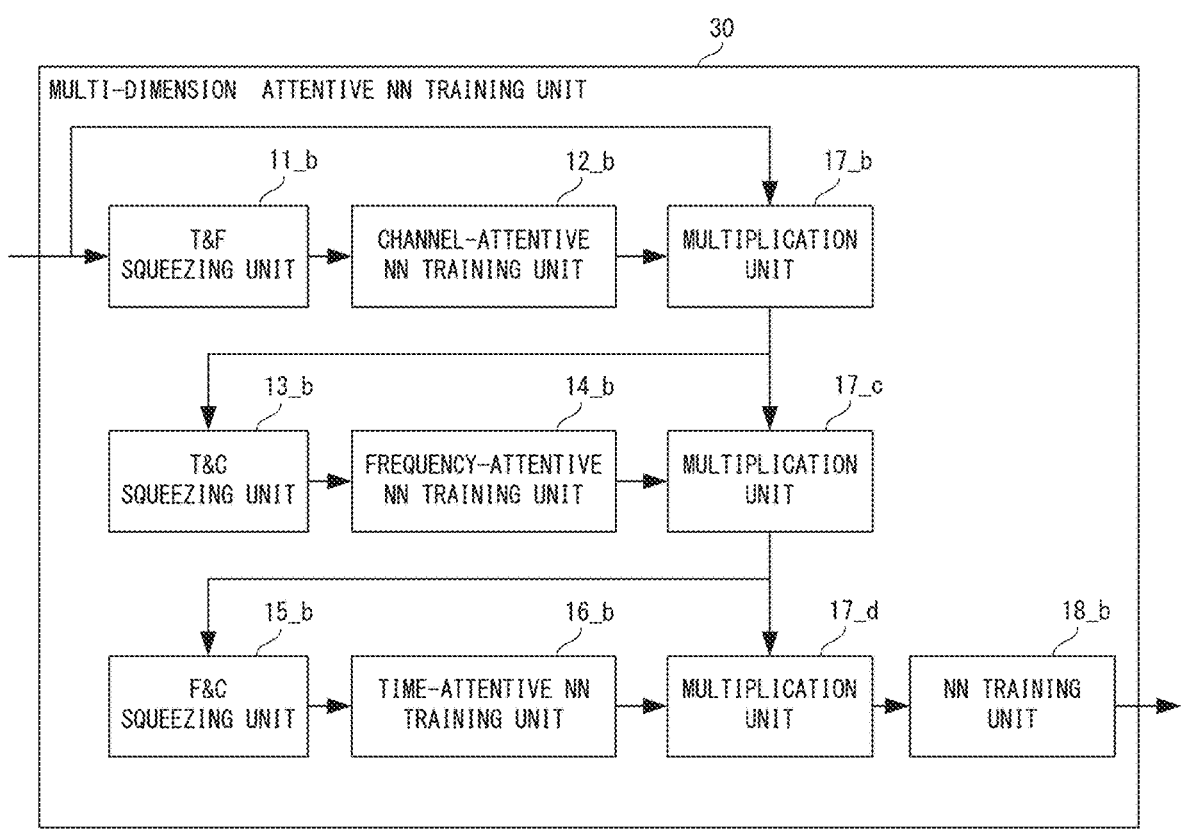
FIG. 5 is a block diagram illustrating the second example of multi-dimension attentive neural network training unit according to the exemplary embodiment.

FIG. 5 is a block diagram illustrating the second example of multi-dimension attentive neural NN training unit 30 according to the exemplary embodiment. In FIG. 5, the multi-dimension attentive NN unit 10 includes a time- and frequency-dimension (T&F) squeezing unit 11_b, a channel-attentive NN training unit 12_b, a time- and channel-dimension (T&C) squeezing unit 13_b, a frequency-attentive NN training unit 14_b, a frequency- and channel-dimension (F&C) squeezing unit 15_a, a time-attentive NN training unit 16_b, a multiplication units 17_b, 17_c, 17_d, and a NN training unit 18_b.

The T&F squeezing unit 11_b squeezes the 3D feature sets input of $[d_c, d_t, d_f]$ dimension along both of the time and frequency dimensions, and gets two statistics (mean and standard deviation) of $d_c$ dimension. The channel-attentive NN training unit 12_b takes the statistics as input and outputs a set of weights for channels, and expands the weights of $d_c$ dimension into $[d_c, d_t, d_f]$, the same size as the input 3D feature sets. The channel-attentive NN training unit 12_b can be the same as or different from the example of the channel-attentive NN training unit 12_a shown FIG. 10. The multiplication unit 17_b multiplies the weight matrix from channel-attentive NN training unit 12_b with the input 3D feature sets in the element-wise manner.

The T&C squeezing unit 13_b squeezes the output of 17_b, along both of the time and channel dimensions, and gets the mean and standard deviation statistics of $d_f$ dimension. The frequency-attentive NN training unit 14_g takes the statistics as input and outputs a set $(d_f)$ of weights for frequency bins, and expands the weights into $[d_c, d_t, d_f]$, the same size as the input feature map. The frequency-attentive NN training unit 14_b can be the same as or different from the example of the channel-attentive NN training unit 12_a shown FIG. 4. The multiplication unit 17_c multiplies the weight matrix from 14_b with the output of 17_b in element-wise manner.

The F&C squeezing unit 15_b squeezes the feature map input, along both of the frequency and channel dimensions, and gets the mean and standard deviation statistics of $d_t$ dimension, respectively. The time-attentive NN training unit 16_b takes the statistics as input and outputs a set $(d_f)$ of weights for time frames, and expands the weights into $[d_c, d_t, d_f]$, the same size as the input feature map. The time-attentive NN training unit 16_b can be the same as or different from the example of the channel-attentive NN training unit 12_a shown FIG. 4. The multiplication unit 17_d multiplies the weight matrix from 16_b with the output of 17_c in element-wise manner.

The NN training unit 18_b takes the output of the multiplication unit 17_d as input. The network training unit 18_b includes one or more hidden layers and one output layer. Note that the multi-dimension attentive NN training unit 10 (11_b~18_b) is trained jointly with only one objective function.

Figure 6:
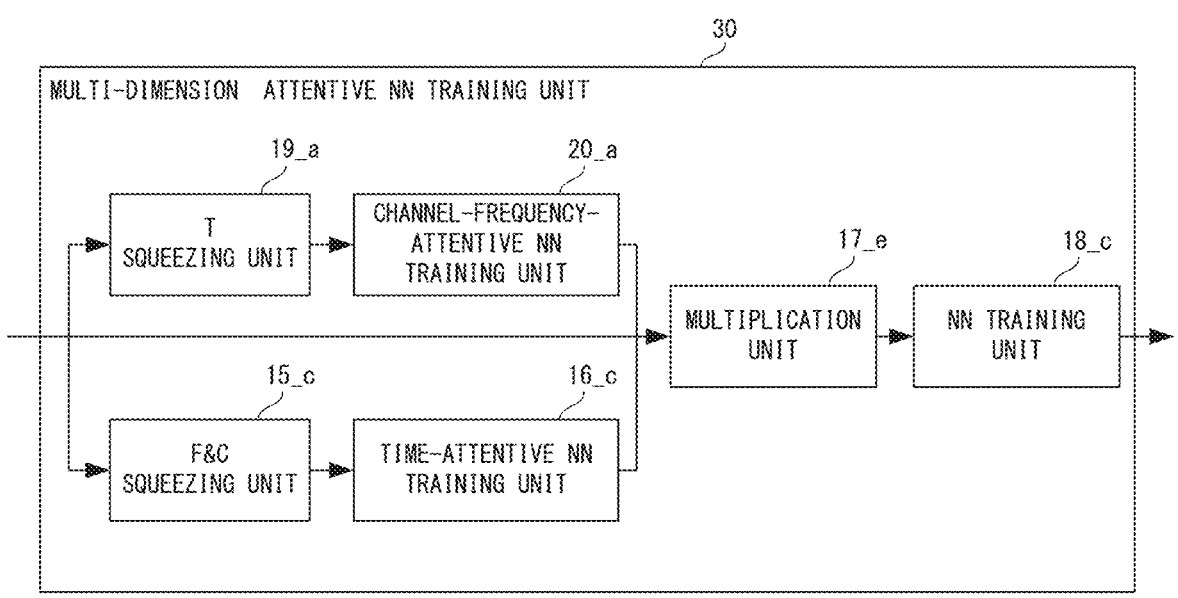
FIG. 6 is a block diagram illustrating the third example of multi-dimension attentive neural network training unit according to the exemplary embodiment

FIG. 6 is a block diagram illustrating the third example of multi-dimension attentive neural NN training unit 30 according to the exemplary embodiment. In FIG. 6, the multi-dimension attentive NN training unit 10 includes a time-dimension (T) squeezing unit 19_a, a channel-frequency attentive NN training unit 20_a, a frequency- and channel-dimension (F&C) squeezing unit 15_c, a time-attentive NN training unit 16_c, a multiplication unit 17_e and a NN training unit 18_c.

The T squeezing unit 19_a squeezes the input 3D feature sets of the dimension $[d_c, d_t, d_f]$ along the time dimension, and gets two statistics (mean and standard deviation) of $[d_c, d_f]$ dimension. The channel-frequency attentive NN training unit 20_a takes the statistics as input and outputs a set of weights of dimension $[d_c, d_f]$, and expands the weights into $[d_c, d_t, d_f]$, the same size as the input feature map. The channel-frequency attentive NN training unit 20_a can be the same as or different from the example of the channel-attentive NN training unit 12_a shown FIG. 4.

The F&C squeezing unit 15_a squeezes the input 3D feature sets along both of the frequency and channel dimensions, and gets the mean and standard deviation statistics of $d_t$ dimension, respectively. The time-attentive NN training unit 16_a takes the statistics as input and outputs a set ($d_t$) of weights for time frames, and expand the weights into [$d_c$, $d_t$, $d_f$], the same size as the input feature map. The time-attentive NN training unit 16_a can be the same as or different from the example of the channel-attentive NN training unit 12_a shown FIG. 4.

The multiplication unit 17_e multiplies the two weight matrices with the input 3D feature maps in the element-wise manner, and pass to the NN training unit 18_c, which includes one or more hidden layers and one output layer. Note that the multi-dimension attentive NN training unit 10 is trained together with only one objective function.

Figure 7:
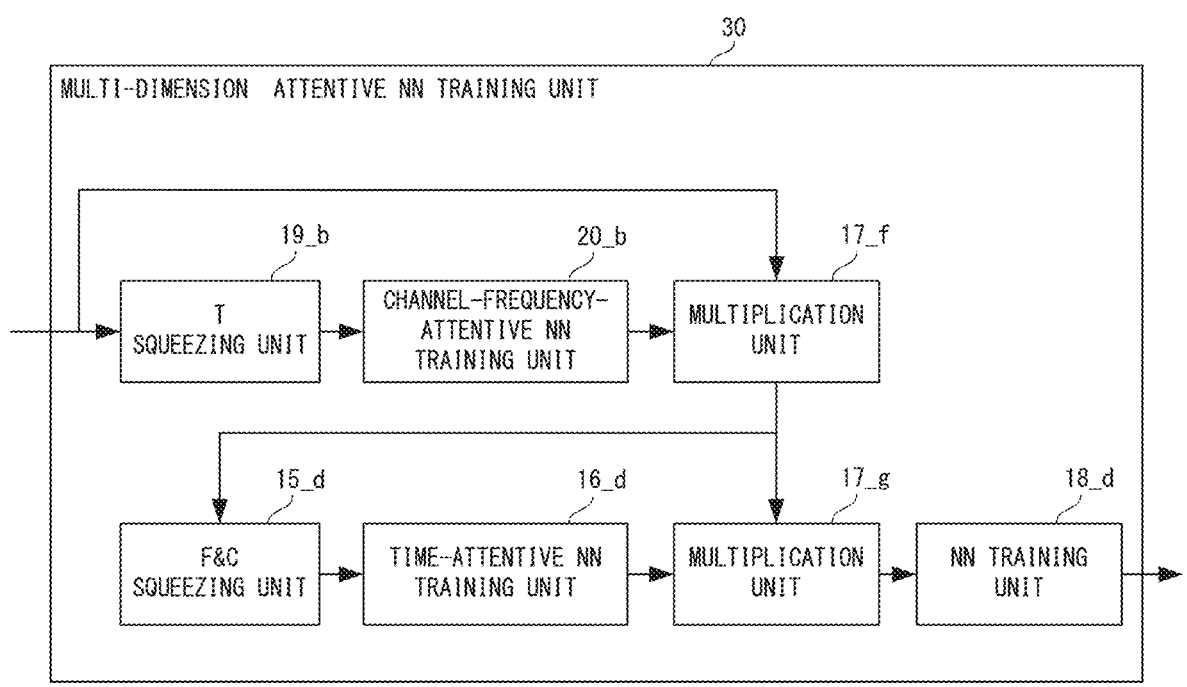
FIG. 7 is a block diagram illustrating the fourth example of multi-dimension attentive neural network training unit according to the exemplary embodiment

FIG. 7 is a block diagram illustrating the fourth example of multi-dimension attentive neural NN training unit 30 according to the exemplary embodiment. In FIG. 7, the multi-dimension attentive NN training unit 30 includes a time-dimension (T) squeezing unit 19_b, a channel-frequency attentive NN training unit 20_b, a frequency- and channel-dimension (F&C) squeezing unit 15_d, a time-attentive NN training unit 16_d, a multiplication units 17_f, 17_g and a NN training unit 18_d.

The T squeezing unit 19_b squeezes the input 3D feature sets of [$d_c$, $d_t$, $d_f$] dimension along the time dimension, and gets two statistics (mean and standard deviation) of [$d_c$, $d_f$] dimension. The channel-frequency attentive network 20_b takes the statistics as input and outputs a set of weights of [$d_c$, $d_f$] dimension, and expands the weights into [$d_c$, $d_t$, $d_f$], the same size as the input feature map. The channel-frequency-attentive NN training unit 20_b can be the same as or different from the example of the channel-attentive NN training unit 12_a shown FIG. 4. The multiplication unit 17_f multiplies the weight matrix from channel-frequency attentive NN training unit 20_b with the input 3D feature sets in the element-wise manner.

The F&C squeezing unit 15_d squeezes the output of 17_f along both of the frequency and channel dimensions, and gets the mean and standard deviation statistics of $d_t$ dimension, respectively. The time-attentive NN training unit 16_d takes the statistics as input and outputs a set ($d_t$) of weights for time frames, and expand the weights into [$d_c$, $d_t$, $d_f$], the same size as the input 3D feature sets. The time-attentive NN training unit 16_d can be the same as or different from the example of the channel-attentive NN training unit 12_a shown FIG. 4. The multiplication unit 17_g multiplies the weight matrix from 16_b with the output of 17_f in element-wise manner.

The NN training unit 18_d takes the output of 17_g as input. 18_d includes one or more hidden layers and one output layer. Note that the multi-dimension attentive NN training unit 30 is trained together with only one objective function.

In the third (FIG. 4) and fourth (FIG. 5) examples of embodiments, the T squeezing unit (19_a, 19_b) and the F&C squeezing unit (15_c, 15_d) can be replaced with a F squeezing unit and a C&T squeezing unit or a C squeezing unit and a T&F squeezing unit. In the first case, 20_a and 20_b are replaced with a channel-time attentive network, and 16_c and 16_d are replaced with frequency-attentive network; in the second case, 20_a and 20_b are replaced with a time-frequency attentive network, and 16_c and 16_d are replaced with channel-attentive network.

Figure 8:
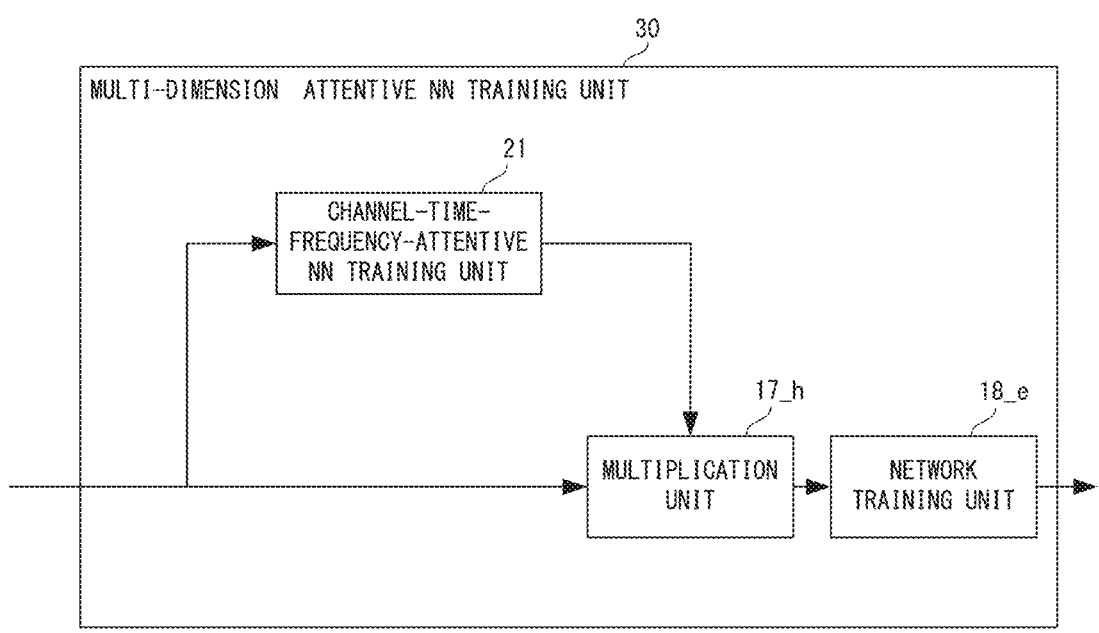
FIG. 8 is a block diagram illustrating the fifth example of multi-dimension attentive neural network training unit according to the exemplary embodiment

FIG. 8 is a block diagram illustrating the fifth example of multi-dimension attentive neural NN training unit 30 according to the exemplary embodiment. In FIG. 8, the multi-dimension attentive NN training unit 10 includes a channel-time-frequency attentive NN training unit 21, a multiplication unit 17_h and a NN training unit 18_e.

The channel-time-frequency attentive network 21 takes the 3D feature sets as input and outputs a set of weights of [$d_c$, $d_t$, $d_f$] dimension. The channel-time-frequency attentive network 21 can be the same as or different from the example of the channel-attentive NN training unit 12_a shown FIG. 4. The multiplication unit 17_h multiplies the weight matrix from 21 with the input 3D feature sets in the element-wise manner.

The NN training unit 18_e takes the output of 17_h as input. 18_e includes one or more hidden layers and one output layer. Note that the multi-dimension attentive NN training unit 30 is trained together with only one objective function.

Operations of Apparatus

Operations performed by the neural network-based signal processing apparatus 100 according to the embodiment of the present invention will be described with reference to FIGS. 9 to 11. FIGS. 1 to 8 will be referenced as necessary in the following description. Also, in the present embodiment, a neural network-based signal processing method is implemented by causing the neural network-based signal processing apparatus to operate. Accordingly, the following description of operations performed by the neural network-based signal processing apparatus 100 will substitute for a description of the neural network-based signal processing method of the embodiment.

Figure 9:
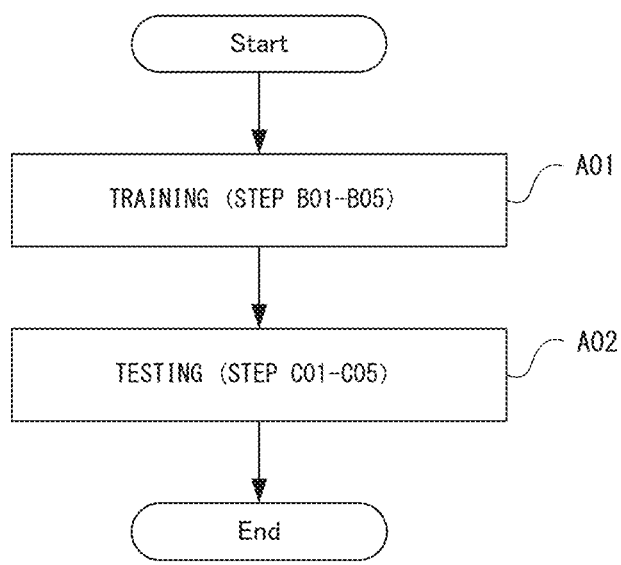
FIG. 9 is a flowchart illustrating an entire operation example of the neural network-based signal processing apparatus according to the exemplary embodiment.

FIG. 9 depicts a flowchart illustrating the entire operation example of the neural network-based signal processing apparatus 100 according to the exemplary embodiment. FIG. 9 shows operations of a training phase and a testing (evaluation) phase. However, FIG. 9 shows an example, the operation of the training and testing can be executed continuously, or time interval can be inserted, or the operation of testing can be executed with other training operation.

First, as shown in FIG. 1, the neural network-based signal processing apparatus 100 operates in the training mode to train the neural network and store the NN parameter in NN parameter storage 40 (step A01). Next the neural network-based signal processing apparatus 100 operates in the testing mode to produces the attention weight and calculate posterior probabilities as scores. (step A02).

Figure 10:
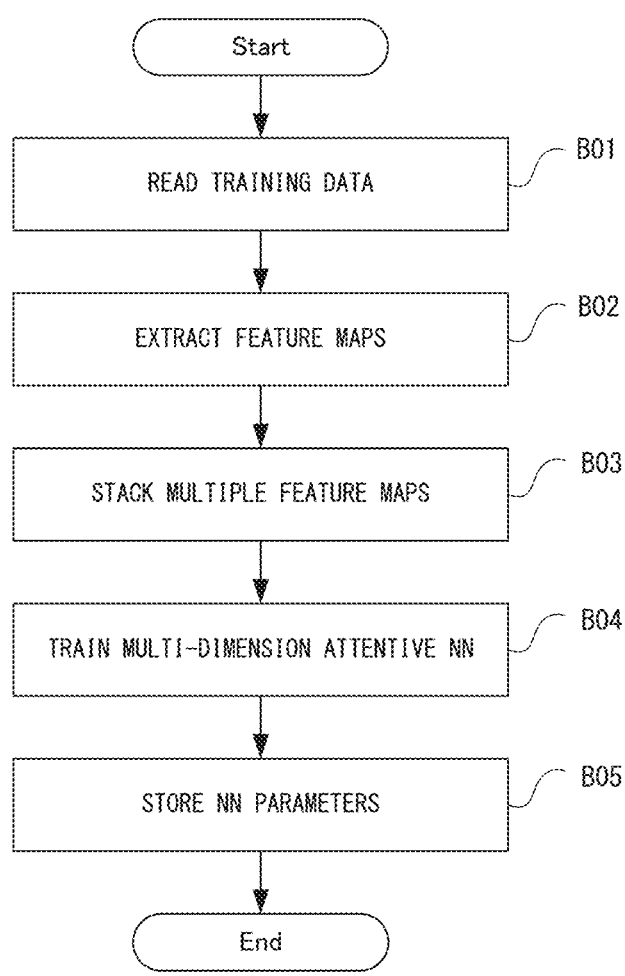
FIG. 10 is a flowchart illustrating a specific operation example of the training phase according to the exemplary embodiment.

FIG. 10 is a flowchart showing specific operations of the training phase of the neural network-based signal processing apparatus 100 according to the present exemplary embodiment. First, the feature map extraction unit 10_a reads the input training data including audios and their labels (step B01). Then, the feature map extraction unit 10_a extracts multiple feature maps from the input training audios (step B02). Next, the multiple feature map stacking unit 20_a stacks the multiple feature maps into 3D feature sets (step B03). After that, the multi-dimension attentive training unit 30 trains a multi-dimension attentive neural network (step B04), and stores a NN parameters in the NN parameter storage 40 (step B05).

Figure 11:
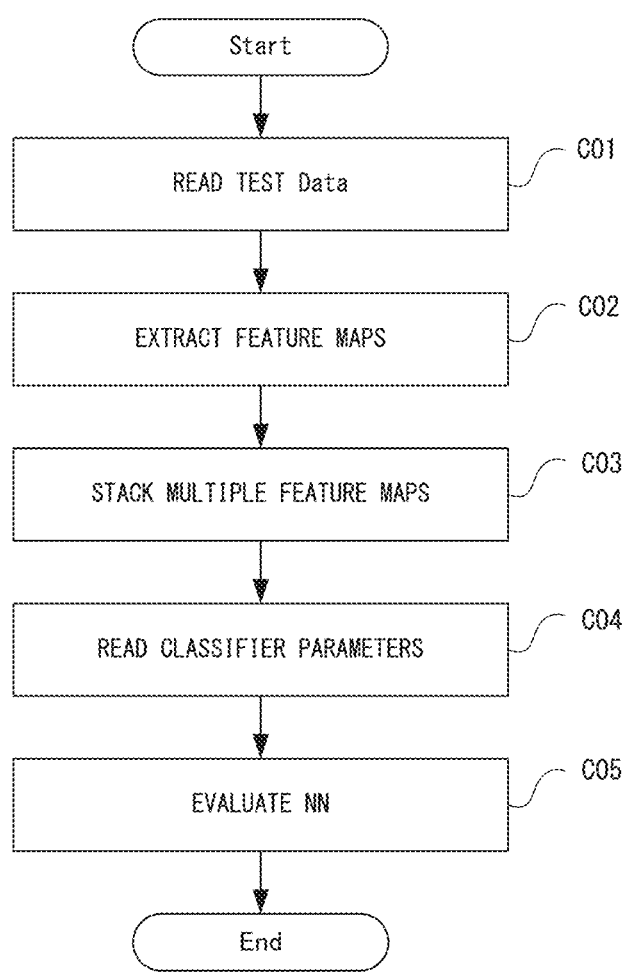
FIG. 11 is a flowchart illustrating a specific operation example of the testing (evaluation) phase according to exemplary embodiment.

FIG. 11 is a flowchart showing specific operation of the evaluation phase according to the embodiment. First, the feature map extraction unit 10_b reads the input test data (step C01). Then, the feature map extraction unit 10_b extracts multiple feature maps from the input testing audios (step C02). Next, the multiple feature map stacking unit 20_b stacks the multiple feature maps into a 3D feature set (step C03). The multi-dimension attentive evaluation unit 50 reads the NN parameters from the NN parameter storage 40 (step C04). Finally, the multi-dimension attentive evaluation unit 50 evaluates the test data and gives an output of scores or new feature sets (step C05).

Effect of the Example Embodiment

This invention introduces an attention mechanism across multiple feature maps and support automatic selection of the best features. According to the present embodiment, it is possible to select important features to the speech processing tasks, even if they locate differently across feature maps. The five examples of multi-dimension attentive NN training unit (FIG. 3,5-8) are given for the different conditions of training data in terms of the amount.

The first (FIG. 3) and the second (FIG. 5) examples of multi-dimension attentive NN training unit 30 learn three weight sets, respectively. The number of weights in both examples are the same: $d_C+d_F+d_T$. They have the least number of weights among all the five examples. It is more suitable when the training data is limited. The first example (FIG. 3) is a parallel connection of the three attentive networks while the second example (FIG. 5) is a serial connection. They are supposed to have the same performance.

The third (FIG. 6) and the fourth (FIG. 7) examples of multi-dimension attentive NN training unit 30 learn two weight sets, respectively. The number of weights in both examples are the same: $d_C*d_F+d_T$. They have a medium number of weights among all the five examples. It is more suitable when the training data is sufficient. The third example (FIG. 7) is a parallel connection of the two attentive networks while the fourth example (FIG. 7) is a serial connection. They are supposed to have the same performance.

The fifth (FIG. 8) examples of multi-dimension attentive NN training unit 30 learn only one weight set. The number of weights is $d_C*d_F*d_T$. It is the most among all the five examples. It is least constrained and supposed to work the best when a huge amount of training data is available.

Program

A program of the embodiment need only be a program for causing a computer to execute steps A01 to A02 shown in FIG. 9, steps B01 to B05 shown in FIG. 10, and steps C01 to C05 shown in FIG. 11. The neural network-based signal processing apparatus 100 and the neural network-based signal processing method according to the embodiment of the present invention can be realized by installing the program on a computer and executing it. In this case, the processor of the computer functions as the feature map extraction unit 10, the multiple feature map stacking unit 20, the multi-dimension attentive NN training unit 30, the NN parameter storage, and the multi-dimension attentive NN evaluation unit 50.

The program according to the embodiment of the present invention may be executed by a computer system constructed using a plurality of computers. In this case, for example, each computer may function as a different one of the feature map extraction unit 10, the multiple feature map stacking unit 20, the multi-dimension attentive NN training unit 30, the NN parameter storage, and the multi-dimension attentive NN evaluation unit 50.

Physical Configuration

Figure 12:
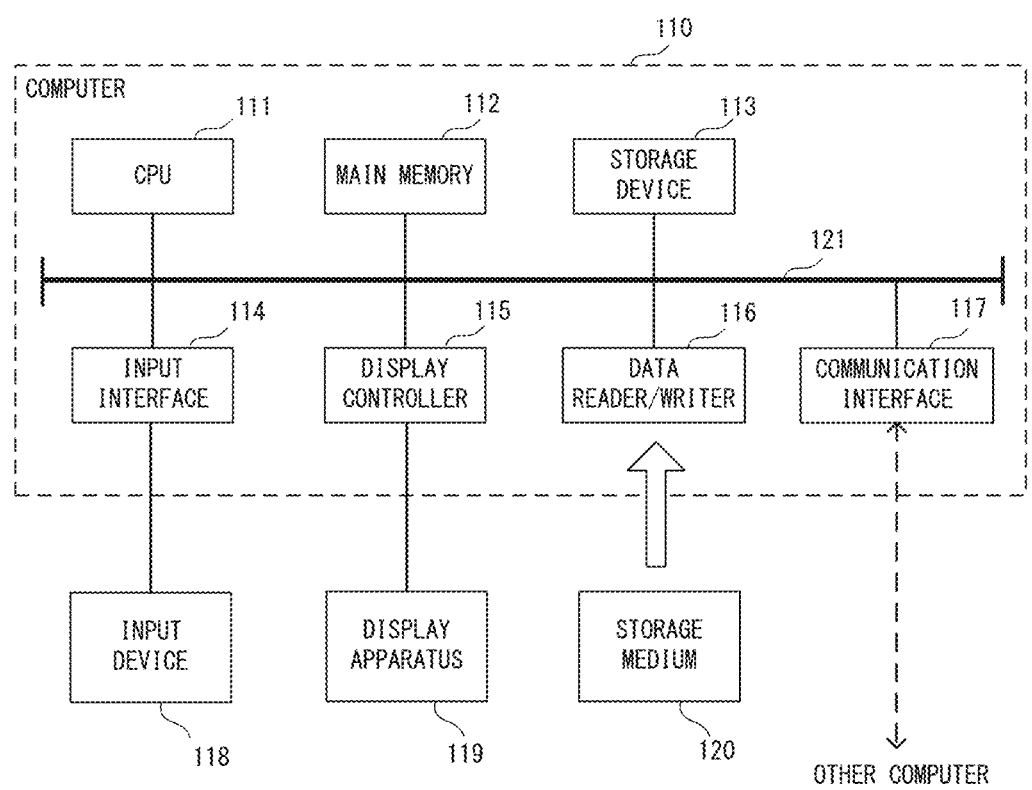
FIG. 12 is a block diagram showing an example of a computer that realizes the neural network-based signal processing apparatus according to the embodiment of the present invention.

The following describes a computer that realizes the neural network-based signal processing apparatus by executing the program of the embodiment, with reference to FIG. 12. FIG. 12 is a block diagram showing an example of a computer that realizes the neural network-based signal processing apparatus according to the embodiment of the present invention.

As shown in FIG. 12, the computer 110 includes a CPU (Central Processing Unit) 111, a main memory 112, a storage device 113, an input interface 114, a display controller 115, a data reader/writer 116, and a communication interface 117. These units are connected via a bus 121 so as to be capable of mutual data communication. The computer 110 may include a graphics processing unit (GPU) or a field-programmable gate array (FPGA) in addition to or instead of the CPU 111.

The CPU 111 carries out various calculations by expanding programs (codes) according to the present embodiment, which are stored in the storage device 113, to the main memory 112 and executing them in a predetermined sequence. The main memory 112 is typically a volatile storage device such as a DRAM (Dynamic Random-Access Memory). Also, the program according to the present embodiment is provided in a state of being stored in a computer-readable storage medium 120. Note that the program according to the present embodiment may be distributed over the Internet, which is connected to via the communication interface 117.

Also, specific examples of the storage device 113 include a semiconductor storage device such as a flash memory, in addition to a hard disk drive. The input interface 114 mediates data transmission between the CPU 111 and an input device 118 such as a keyboard or a mouse. The display controller 115 is connected to a display device 119 and controls display on the display device 118.

The data reader/writer 116 mediates data transmission between the CPU 111 and the storage medium 120, reads out programs from the storage medium 120, and writes results of processing performed by the computer 110 in the storage medium 120. The communication interface 17 mediates data transmission between the CPU 111 and another computer.

Also, specific examples of the storage medium 120 include a general-purpose semiconductor storage device such as CF (Compact Flash (registered trademark)) and SD (Secure Digital), a magnetic storage medium such as a flexible disk, and an optical storage medium such as a CD-ROM (Compact Disk Read Only Memory).

The neural network-based signal processing apparatus 100 according to the present exemplary embodiment can also be realized using items of hardware corresponding to various components, rather than using the computer having the program installed therein. Furthermore, the neural network-based signal processing apparatus 100 may be realized by the program, and the remaining part of the neural network-based signal processing apparatus 100 may be realized by hardware.

The above-described embodiment can be partially or entirely expressed by, but is not limited to, the following Supplementary Notes 1 to 18.

(Supplementary Note 1)

A neural network-based signal processing apparatus comprising:

a multi-dimension attentive neural network evaluation unit that receives a multi-dimension features which contain two or more two-dimension feature maps, produces an attention weight for each element in the multi-dimension features by using a neural network, and produces low-dimension features or posterior probabilities for designated classes, based on the multi-dimension features and the attention weight.

(Supplementary Note 2)

The neural network-based signal processing apparatus according to supplementary note 1, Wherein the multi-dimension attentive neural network evaluation unit squeezes the multi-dimension features along two dimensions by calculating statistics and produces an attention weight for the rest one dimension by using a neural network.

(Supplementary Note 3)

The neural network-based signal processing apparatus according to supplementary note 1, Wherein the multi-dimension attentive neural network evaluation unit that squeeze the multi-dimension features along any single dimension by calculating statistics and produces an attention weight for the rest two dimensions by using a neural network.

(Supplementary Note 4)

The neural network-based signal processing apparatus according to any of supplementary notes 1 to 3, further comprising a multi-dimension attentive network training unit that receives a multi-dimension features which contain two or more two-dimension feature maps, trains an attention network jointly with a classification network, using labeled multi-dimension features.

(Supplementary Note 5)

The neural network-based signal processing apparatus according to supplementary note 4, wherein the multi-dimension attentive network training unit multiplies a weight matrix and the multi-dimension features, trains the attention network jointly with a classification network, using the labeled multi-dimension features after multiplication.

(Supplementary Note 6)

The neural network-based signal processing apparatus, according to any of supplementary notes 1 to 5, Wherein the multi-dimension attentive neural network evaluation unit produces a posterior probability that the input multi-dimension features are from a genuine speech or spoofing.

(Supplementary Note 7)

A neural network-based signal processing method comprising:

(a) a step of receiving a multi-dimension features which contain two or more two-dimension feature maps, produces an attention weight for each element in the multi-dimension features by using a neural network, and producing low-dimension features or posterior probabilities for designated classes, based on the multi-dimension features and the attention weight.

(Supplementary Note 8)

The neural network-based signal processing method according to supplementary note 7, Wherein in the step (a), squeezing the multi-dimension features along two dimensions by calculating statistics and produces an attention weight for the rest one dimension by using a neural network.

(Supplementary Note 9)

The neural network-based signal processing method according to supplementary note 7, Wherein in the step (a), squeezing the multi-dimension features along any single dimension by calculating statistics and produces an attention weight for the rest two dimensions by using a neural network.

(Supplementary Note 10)

The neural network-based signal processing method according to any of supplementary notes 7 to 9, further comprising (c) a step of receiving a multi-dimension features which contain two or more two-dimension feature maps, trains an attention network jointly with a classification network, using labeled multi-dimension features.

(Supplementary Note 11)

The neural network-based signal processing method according to supplementary note 10, wherein in the step (c), multiplying a weight matrix and the multi-dimension features, trains the attention network jointly with a classification network, using the labeled multi-dimension features after multiplication.

(Supplementary Note 12)

The neural network-based signal processing method, according to any of supplementary notes 7 to 11, Wherein in the step (a), producing a posterior probability that the input multi-dimension features are from a genuine speech or spoofing.

(Supplementary Note 13)

A computer-readable storage medium storing a program that includes commands for causing a computer to execute:

(a) a step of receiving a multi-dimension features which contain two or more two-dimension feature maps, produces an attention weight for each element in the multi-dimension features by using a neural network, and producing low-dimension features or posterior probabilities for designated classes, based on the multi-dimension features and the attention weight.

(Supplementary Note 14)

The computer-readable storage medium according to supplementary note 13,

Wherein in the step (a), squeezing the multi-dimension features along two dimensions by calculating statistics and produces an attention weight for the rest one dimension by using a neural network.

(Supplementary Note 15)

The computer-readable storage medium according to supplementary note 13,

Wherein in the step (a), squeezing the multi-dimension features along any single dimension by calculating statistics and produces an attention weight for the rest two dimensions by using a neural network.

(Supplementary Note 16)

The computer-readable storage medium according to any of supplementary notes 13 to 15, Wherein the program further includes commands causing the computer to execute (c) a step of receiving a multi-dimension features which contain two or more two-dimension feature maps, trains an attention network jointly with a classification network, using labeled multi-dimension features.

(Supplementary Note 17)

The computer-readable storage medium according to supplementary note 16, wherein in the step (c), multiplying a weight matrix and the multi-dimension features, trains the attention network jointly with a classification network, using the labeled multi-dimension features after multiplication.

(Supplementary Note 18)

The computer-readable storage medium, according to any of supplementary notes 13 to 17, Wherein in the step (a), producing a posterior probability that the input multi-dimension features are from a genuine speech or spoofing.

Although the invention of the present application has been described above with reference to the embodiment, the invention of the present application is not limited to the above embodiment. Various changes that can be understood by a person skilled in the art can be made to the configurations and details of the invention of the present application within the scope of the invention of the present application.

INDUSTRIAL APPLICABILITY

As described above, according to the present invention, it is possible to suppress misrecognition by using multiple spectrograms obtained from speech in speaker spoofing detection. The present invention is useful in fields, e.g. speaker verification.

REFERENCE SIGNS LIST 10 feature map extraction unit
20 multiple feature map stacking unit
30 multi-dimension attentive neural network (NN) training unit
40 neural network (NN) parameter storage
50 multi-dimension attentive neural network (NN) evaluation unit
100 neural network-based signal processing apparatus
110 Computer
111 CPU
112 Main memory
113 Storage device
114 Input interface
115 Display controller
116 Data reader/writer
117 Communication interface
118 Input device
119 Display apparatus
120 Storage medium
121 Bus

What is claimed is:

1. A neural network-based signal processing apparatus comprising:
at least one memory storing instructions; and
at least one processor configured to execute the instructions to:
receive multi-dimension features containing two or more two-dimension feature maps, where the multi-dimension features are labeled;
produce a first weight matrix including a plurality of first attentive weights for a plurality of elements, respectively, in the multi-dimension features by using a time-attentive neural network;
produce a second weight matrix including a plurality of second attentive weights for the plurality of elements, respectively, in the multi-dimensional features by using a channel-frequency-attentive neural network;
produce low-dimension features or posterior probabilities for designated classes, based on the multi-dimension features and the first and second attention weights;
multiply the first and second weight matrices and the multi-dimensional features;
train an attention network jointly with a classification network, using the multi-dimension features as labeled and after multiplication;
receive input data; and
classify the input data using the attention network and the classification network that have been trained.

2. The neural network-based signal processing apparatus according to claim 1,
wherein the at least one processor is configured to execute the instructions to:
squeeze the multi-dimension features along two dimensions by calculating statistics; and
produce the first attentive weights for dimensions other than the two dimensions by using the time-attentive neural network.

3. The neural network-based signal processing apparatus according to claim 1,
wherein the at least one processor is configured to execute the instructions to:
squeeze the multi-dimension features along a single dimension by calculating statistics; and
produce the first attentive weights for dimensions other than the single dimension by using the time-attentive neural network.

4. The neural network-based signal processing apparatus according to claim 1,
wherein the at least one processor is configured to execute the instructions to:
produce a posterior probability that the input multi-dimension features are from genuine speech or spoofing.

5. A neural network-based signal processing method performed by a computer and comprising:
receiving multi-dimension features containing two or more two-dimension feature maps, where the multi-dimension features are labeled;
producing a first weight matrix including a plurality of first attentive weights for a plurality of elements, respectively, in the multi-dimension features by using a time-attentive neural network;
producing a second weight matrix including a plurality of second attentive weights for the plurality of elements, respectively, in the multi-dimensional features by using a channel-frequency-attentive neural network;
producing low-dimension features or posterior probabilities for designated classes, based on the multi-dimension features and the first and second attention weights;
multiplying the first and second weight matrices and the multi-dimensional features;
training an attention network jointly with a classification network, using the multi-dimension features as labeled and after multiplication;
receiving input data; and
classifying the input data using the attention network and the classification network that have been trained.

6. A non-transitory computer-readable storage medium storing a program executable by a computer to perform processing comprising: execute:
receiving multi-dimension features containing two or more two-dimension feature maps, where the multi-dimension features are labeled;
producing a first weight matrix including a plurality of first attentive weights for a plurality of elements, respectively, in the multi-dimension features by using a time-attentive neural network;
producing a second weight matrix including a plurality of second attentive weights for the plurality of elements, respectively, in the multi-dimensional features by using a channel-frequency-attentive neural network;

producing low-dimension features or posterior probabilities for designated classes, based on the multi-dimension features and the first and second attention weights;

multiplying the first and second weight matrices and the multi-dimensional features;

training an attention network jointly with a classification network, using the multi-dimension features as labeled and after multiplication;

receiving input data; and classifying the input data using the attention network and the classification network that have been trained.

7. The neural network-based signal processing method according to claim 5, further comprising:

squeezing the multi-dimension features along two dimensions by calculating statistics; and producing the first attentive weights for dimensions other than the two dimensions by using the time-attentive neural network.

8. The neural network-based signal processing method according to claim 5, further comprising:

squeezing the multi-dimension features along a single dimension by calculating statistics; and producing the first attentive weights for dimensions other than the single dimension by using the time-attentive neural network.

9. The neural network-based signal processing method, according to claim 5, further comprising:

producing a posterior probability that the input multi-dimension features are from genuine speech or spoofing.

10. The non-transitory computer-readable storage medium according to claim 6, wherein the processing further comprises:

squeezing the multi-dimension features along two dimensions by calculating statistics; and producing the first attentive weights for dimensions other than the two dimensions by using the time-attentive neural network.

11. The non-transitory computer-readable storage medium according to claim 6, wherein the processing further comprises:

squeezing the multi-dimension features along a single dimension by calculating statistics; and producing the first attentive weights for dimensions other than the single dimension by using the time-attentive neural network.

12. The non-transitory computer-readable storage medium according to claim 6, wherein the processing further comprises:

producing a posterior probability that the input multi-dimension features are from genuine speech or spoofing.

* * * * *